United States Patent
Chen et al.

(10) Patent No.: US 9,279,039 B2
(45) Date of Patent: Mar. 8, 2016

(54) BLOWING AGENT COMPOSITION OF HYDROCHLOROFLUOROOLEFIN AND HYDROFLUOROOLEFIN

(75) Inventors: Benjamin Bin Chen, Wayne, PA (US); Joseph S. Costa, Gilbertsville, PA (US); Philippe Bonnet, Lower Merion, PA (US); Maher Y. Elsheikh, Wayne, PA (US); Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 12/532,202

(22) PCT Filed: Mar. 28, 2008

(86) PCT No.: PCT/US2008/058607
§ 371 (c)(1),
(2), (4) Date: Sep. 21, 2009

(87) PCT Pub. No.: WO2008/121790
PCT Pub. Date: Oct. 9, 2008

(65) Prior Publication Data
US 2010/0076100 A1 Mar. 25, 2010

Related U.S. Application Data

(60) Provisional application No. 60/908,751, filed on Mar. 29, 2007.

(51) Int. Cl.
*C07C 21/04* (2006.01)
*C07C 21/18* (2006.01)
*C08J 9/00* (2006.01)
*C08J 9/14* (2006.01)
*C08G 18/06* (2006.01)

(52) U.S. Cl.
CPC .............. *C08J 9/146* (2013.01); *C08G 18/06* (2013.01); *C08J 9/144* (2013.01); *C08J 9/149* (2013.01); *C08J 2203/142* (2013.01); *C08J 2203/162* (2013.01); *C08J 2203/182* (2013.01); *C08J 2300/106* (2013.01)

(58) Field of Classification Search
USPC ........................................ 521/98; 252/182.15
See application file for complete search history.

(56) References Cited

U.S. PATENT DOCUMENTS

2005/0233932 A1    10/2005  Singh et al.
2007/0010592 A1 *   1/2007  Bowman et al. .............. 521/131

FOREIGN PATENT DOCUMENTS

JP              3034941 A       2/1991
WO      WO2006/069362           6/2006
WO      WO 2006/094303 A2       9/2006

OTHER PUBLICATIONS

Kenneth Denbigh; The Principles of Chemical Equilibrium, 4th Edition; Cambridge University Press ISBN 0 521 28150; pp. 222 & 246.
Walter J. Moor, Professor of Physical Chemistry, The University of Sydney; "Physical Chemistry" 4th Edition; Prentice Hall Inc., 1972 ISBN 0-13-665968-3; Englewood Cliffs, New Jersey pp. 254-255

* cited by examiner

*Primary Examiner* — Kara Boyle
(74) *Attorney, Agent, or Firm* — Steven D. Boyd

(57) ABSTRACT

A blowing agent for thermosetting foams is disclosed. The blowing agent is a hydrofluoroolefin (HCFO), preferably HFCO-1234yf in combination with a hydrochlorofluoroolefin (HCFO) preferably one selected from HCFO-1233zd, HCFO-1223, HCFO-1233xf and mixtures thereof. The blowing agent is effective as a blowing agent in the manufacture of thermosetting foams.

6 Claims, No Drawings

BLOWING AGENT COMPOSITION OF HYDROCHLOROFLUOROOLEFIN AND HYDROFLUOROOLEFIN

FIELD OF THE INVENTION

The present invention relates to blowing agents for thermosetting foams. More particularly, the present invention relates to the use of at least one hydrofluoroolefin such as HFO-1234yf in combination with at least one hydrochlorofluoroolefin (HCFO) such as HCFO-1223, HCFO-1233zd, HCFO-1233xf and mixtures thereof as a blowing agent in the manufacture of thermosetting foams.

BACKGROUND OF THE INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset foams include HFC-134a, HFC-245fa, HFC-365mfc that have relatively high global warming potential, and hydrocarbons such as pentane isomers flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warming potential and zero or near zero ozone depletion properties desired.

The object of the present invention is to provide novel compositions that can serve as blowing agents for thermosetting foams that provide unique characteristics to meet the demands of low or zero ozone depletion potential, lower global warming potential and exhibit low toxicity.

SUMMARY OF THE INVENTION

The present invention relates to the use of blowing agents with negligible (low or zero) ozone-depletion and low global warming potential based upon unsaturated halogenated hydroolefins. The blowing agents comprise at least one hydrofluoroolefin preferably (HFO) HFO-1234yf in a combination with at least one hydrochlorofluoroolefin (HCFO) such as HCFO-1223, HCFO-1233zd, HCFO-1233xf and mixtures thereof. HFO-1234yf is 2,3,3,3-tetrafluoropropene; HCFO 1223 is dichlorotrifluoropropene; HCFO-1233zd is 1-chloro-3,3,3-trifluoropropene; HCFO1233xf is 2-chloro-3,3,3-trifluoropropene. The composition can further comprise an additional hydrofluoroolefin (HFO), a hydrofluorocarbon, a hydrocarbon, an alcohol, an ester, an aldehyde, a ketone ether/diether, carbon dioxide and mixtures thereof.

Hydrofluoroolefin (HFO) materials have been proposed as blowing agents which exhibit a low global warming potential and a low ozone depletion value. The low global warming potential and a low ozone depletion value are a result of the atmospheric degradation of the hydrofluoroolefins.

The hydrofluoroolefin, preferably HFO-1234yf in combination with a hydrochlorofluoroolefin (HCFO) preferably selected from HCFO-1223, HCFO-1233zd, HCFO-1233xf and mixtures thereof combination can be used as a foaming agent for thermosetting foams by being mixed in a polyols mixture. The resulted products show superior quality including decreased density and improved k-factor. The foaming agent dissolves in thermosetting polymers, and provides a degree of plasticization sufficient to produce acceptable foams.

The preferred blowing agent composition, hydrofluoroolefin, preferably HFO-1234yf in combination with a hydrochlorofluoroolefin (HCFO) preferably selected from HCFO-1223, HCFO-1233zd, HCFO-1233xf and mixtures thereof of the present invention exhibits good solubility in polyol mixture used in producing polyurethane and polyisocyanurate foams. A preferred ratio of the hydrofluoroolefin, preferably HFO-1234yf component in combination with a hydrochlorofluoroolefin (HCFO) preferably selected from HCFO-1223, HCFO-1233zd, HCFO-1233xf and mixtures thereof is more than about 5 wt % hydrofluoroolefin.

The hydrofluoroolefin, preferably HFO-1234yf in combination with a hydrochlorofluoroolefin (HCFO) preferably selected from HCFO-1223, HCFO-1233zd, HCFO-1233xf and mixtures thereof composition of the present invention may be used in combination with low or zero ozone depletion value materials including but not limited to: (a) hydrofluorocarbons including but not limited to difluoromethane (HFC32); 1,1,1-trifluoroethane (143a); 1,1,1,2,2-pentafluoroethane (HFC125); 1,1,2,2-tetrafluoroethane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee). (b) additional hydrofluoroolefins, other than HFO-1234yf, including but not limited to tetrafluoropropenes such as HFO1234ze; trifluoropropenes such as HFO1243zf, all tetrafluorobutene isomers (HFO1354), all pentafluorobutene isomers (HFO1345), all hexafluorobutene isomers (HFO1336), all heptafluorobutene isomers (HFO1327), all heptafluoropentene isomers (HFO1447) all octafluoropentene isomers (HFO1438), all nonafluoropentene (HFO1429) (c) hydrocarbons including but not limited to, pentane isomers, butane isomers, (d) C1 to C5 alcohols, C1 to C4 aldehydes, C1 to C4 esters, C1 to C4 ketones, C1 to C4 ethers and diethers and carbon dioxide The foamable compositions of the present invention generally includes one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the invention. In yet other embodiments, the invention provides foamable compositions comprising thermosetting foams, such as polyurethane and polyisocyanurate foams, preferably low-density foams, flexible or rigid.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A polymer blowing agent composition for thermosetting foams comprising (a) from 20 to 50 weight % HFO-1234yf in combination with (b) from 50 to 80 weight % of the hydrochlorofluoroolefin HCFO-1233zd.

2. The polymer blowing agent composition of claim 1, further comprising a non-HFO and non-HCFO hydrofluorocarbon.

3. The polymer blowing agent composition of claim 2 wherein said non-HFO and non-HCFO hydrofluorocarbon is selected from the group consisting of difluoromethane (HFC32); 1,1,1,2,2-pentafluoroethane (HFC125); 1,1,1-trifluoroethane (143a); 1,1,2,2-tetrafluoroethane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee).

4. The polymer blowing agent composition of claim 1, further comprising a second hydrofluoroolefin selected from the group consisting of tetrafluoropropenes; trifluoropropenes; tetrafluorobutene isomers; pentafluorobutene isomers; hexafluorobutene isomers; heptafluorobutene isomers; heptafluoropentene isomers; octafluoropentene isomers and nonafluoropentene isomers.

5. The polymer blowing agent composition of claim 1 further comprising a component selected from the group consisting of a second hydrofluoroolefin (HFO), a hydrofluorocarbon, a hydrocarbon, an alcohol, an ester, an aldehyde, a ketone ether/diether, carbon dioxide and mixtures thereof.

6. The polymer blowing agent composition of claim 1, further comprising a second hydrofluoroolefin selected from the group consisting of HFO-1234ze; HFO-1243zf, HFO-1354; HFO-1345; HFO-1336; HFO-1327; HFO-1447; HFO-1438 and HFO-1429.

* * * * *